(12) United States Patent
Richelle

(10) Patent No.: US 9,499,229 B2
(45) Date of Patent: Nov. 22, 2016

(54) BICYCLE FOR TRANSPORTING A CHILD WITH INCREASED STABILITY

(71) Applicant: Etienne Richelle, Braine l'Alleud (BE)

(72) Inventor: Etienne Richelle, Braine l'Alleud (BE)

( * ) Notice: Subject to any disclaimer, the term of this patent is extended or adjusted under 35 U.S.C. 154(b) by 0 days.

(21) Appl. No.: 14/363,830

(22) PCT Filed: Dec. 10, 2012

(86) PCT No.: PCT/EP2012/074991
§ 371 (c)(1),
(2) Date: Jun. 9, 2014

(87) PCT Pub. No.: WO2013/083849
PCT Pub. Date: Jun. 13, 2013

(65) Prior Publication Data
US 2014/0346751 A1    Nov. 27, 2014

(30) Foreign Application Priority Data

Dec. 9, 2011   (BE) .................................. 2011/0715

(51) Int. Cl.
| | |
|---|---|
| *B62K 7/00* | (2006.01) |
| *B62K 7/02* | (2006.01) |
| *B62K 19/46* | (2006.01) |
| *B62J 1/16* | (2006.01) |
| *B62J 17/08* | (2006.01) |

(52) U.S. Cl.
CPC .. *B62K 7/02* (2013.01); *B62J 1/16* (2013.01); *B62J 17/08* (2013.01); *B62K 7/00* (2013.01); *B62K 19/46* (2013.01)

(58) Field of Classification Search
CPC ........ B62K 7/00; B62K 19/30; B62K 19/40; B62K 19/46; B62K 19/48
USPC ......... 280/202, 281.1, 282, 288, 756, 288.4; 180/21, 219; 224/415, 419, 160, 190, 224/576; D6/333; D12/402; 135/20.1; 296/78.1

See application file for complete search history.

(56) References Cited

U.S. PATENT DOCUMENTS

| | | | | |
|---|---|---|---|---|
| 1,858,743 | A | * | 5/1932 | Langstreth .................... 180/226 |
| 2,787,970 | A | * | 4/1957 | Bennett ........................... 105/95 |
| 3,016,967 | A | * | 1/1962 | Rehfeld ........................ 180/219 |
| 3,256,034 | A | * | 6/1966 | Condray ....................... 296/102 |
| 3,802,598 | A | * | 4/1974 | Burger et al. ................. 280/202 |
| 3,873,127 | A | * | 3/1975 | McNichol et al. ........... 280/202 |

(Continued)

FOREIGN PATENT DOCUMENTS

| | | | |
|---|---|---|---|
| BR | MU8402701 U | | 2/2006 |
| CN | CH220389 A | * | 3/1942 |

(Continued)

OTHER PUBLICATIONS

International Search Report, dated Apr. 3, 2013, from corresponding PCT application.

*Primary Examiner* — Joseph Rocca
*Assistant Examiner* — Daniel Yeagley
(74) *Attorney, Agent, or Firm* — Young & Thompson

(57) ABSTRACT

The aim of the invention is to improve the stability of bicycles fitted with at least one seat for transporting children, by re-centering and lowering the centre of gravity of the child via a specific frame structure, optionally in combination with a choice of reduced wheel diameters and/or an increase in the spacing of the pedals. The location for the feet (31) of the child is inside the supporting structure (9, 10') of the bicycle linking the seat tube (4') to the rear wheel axle (14).

2 Claims, 9 Drawing Sheets

(56) References Cited

U.S. PATENT DOCUMENTS

| | | | |
|---|---|---|---|
| 4,022,488 A * | 5/1977 | Likas | 280/202 |
| 4,045,077 A * | 8/1977 | DeVone | 296/78.1 |
| 4,183,418 A * | 1/1980 | Dudas | 180/216 |
| 4,313,511 A * | 2/1982 | Soo Hoo | 180/21 |
| D294,778 S * | 3/1988 | Lynch | D6/333 |
| 4,792,040 A * | 12/1988 | Wagstaff, III | 206/223 |
| 4,932,572 A * | 6/1990 | Ippolito et al. | 224/415 |
| 5,161,430 A * | 11/1992 | Febey | 74/594.7 |
| 5,234,143 A * | 8/1993 | Mahvi et al. | 224/415 |
| 5,297,846 A | 3/1994 | Rafter | |
| 5,358,267 A * | 10/1994 | Wakefield | 280/304.3 |
| 5,470,092 A * | 11/1995 | Fardy | 280/288 |
| 5,622,374 A * | 4/1997 | Rudeen et al. | 280/202 |
| 5,863,058 A * | 1/1999 | Jinks | 280/202 |
| 6,076,539 A * | 6/2000 | Richardson | 135/20.1 |
| 6,092,820 A * | 7/2000 | Evans | 280/202 |
| 6,227,557 B1 * | 5/2001 | Perret | 280/288.4 |
| 6,443,469 B1 * | 9/2002 | Cross et al. | 280/47.4 |
| 7,144,024 B2 * | 12/2006 | Falkner et al. | 280/202 |
| 7,845,664 B2 * | 12/2010 | Rodgers | 280/204 |
| 8,382,135 B1 * | 2/2013 | Raike et al. | 280/282 |
| 2001/0038190 A1 * | 11/2001 | Provencher | 280/281.1 |
| 2003/0102657 A1 * | 6/2003 | Kuo | 280/755 |
| 2004/0245741 A1 | 12/2004 | Falkner et al. | |
| 2007/0235977 A1 * | 10/2007 | Cleland | 280/281.1 |

FOREIGN PATENT DOCUMENTS

| | | |
|---|---|---|
| DE | 4331510 A1 * | 3/1995 |
| DE | 102010005916 A1 | 8/2011 |
| FR | 1047562 A | 12/1953 |
| FR | 2583367 A1 | 12/1986 |

\* cited by examiner

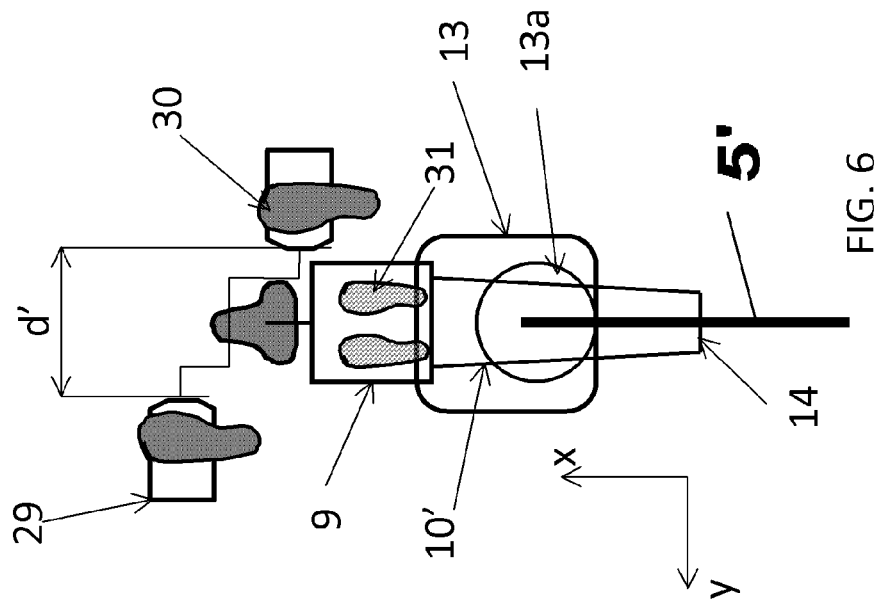
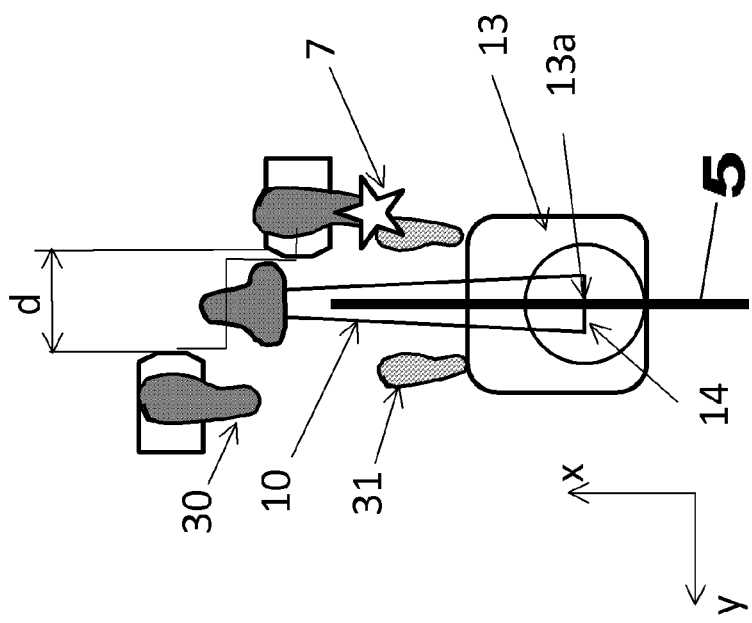
FIG. 5 (PRIOR ART)
FIG. 6

BICYCLE FOR TRANSPORTING A CHILD WITH INCREASED STABILITY

The invention relates to a bicycle equipped with a rear seat for a child.

The most common way to transport a child on a bicycle is to install a special seat generally attached to the seat tube or to the baggage carrier. In this type of configuration, the center of gravity of the child is longitudinally at the level of the axle of the rear wheel, even slightly behind. This causes a pitching-up moment.

The seat is installed above the rear wheel, ordinarily with a diameter of 26 inches (660 mm), and is elevated, thus creating—at the slightest imbalance—a moment that has a tendency to lay the bicycle on its side.

The combination of these two moments makes the bicycle difficult to handle and unstable as soon as it inclines laterally or pitches up. This instability is particularly critical for an adult of small stature when the latter is pushing the bicycle, for example to go up a curb with the child installed on the bicycle.

The invention proposes a solution that makes it possible to eliminate the pitching-up moment and to reduce the moment that has the effect of laying down the bicycle.

The invention proposes in effect a solution aiming at improving the stability of bicycles equipped with a seat or seats for transporting a child by realigning and lowering the center of gravity of the child by means of a particular frame structure, optionally or preferably in combination with a choice of reduced wheel diameters and/or an increase in the spacing of the pedals.

The invention will be more easily understood upon examination of the following description in conjunction with the accompanying drawings in which:

FIG. 5 is a plan view of a bicycle of the prior art, with a foot of the child and the corresponding foot of the adult in the same longitudinal plane;

FIG. 6 is a plan view of the bicycle according to an embodiment of the invention with a modified frame structure and enlarged crankset and showing the feet of the child and those of the adult in different longitudinal planes;

Figure 1:
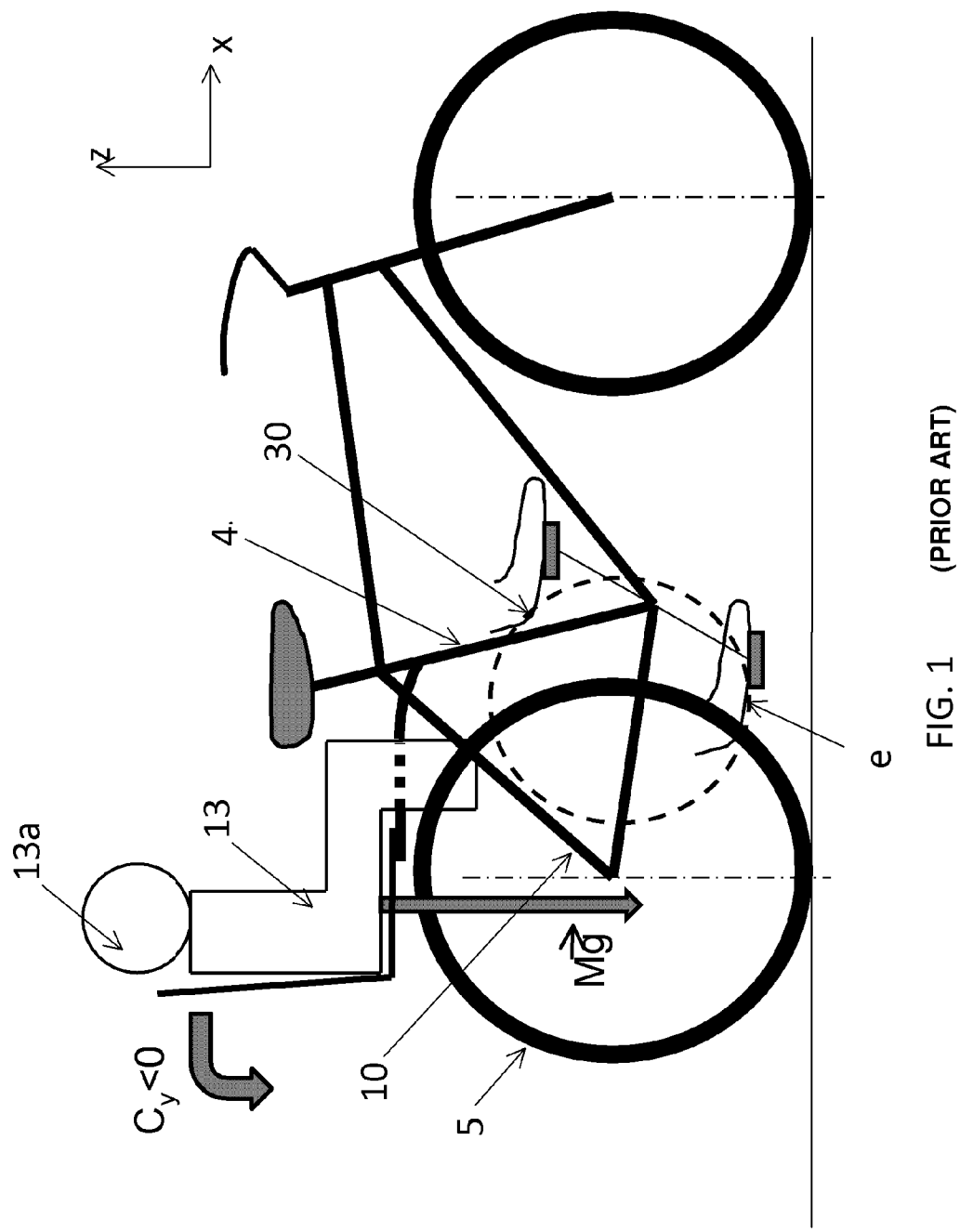
FIG. 1 is a diagrammatic side view illustrating the pitching-up moment for a standard bicycle of the prior art.
Figure 2:
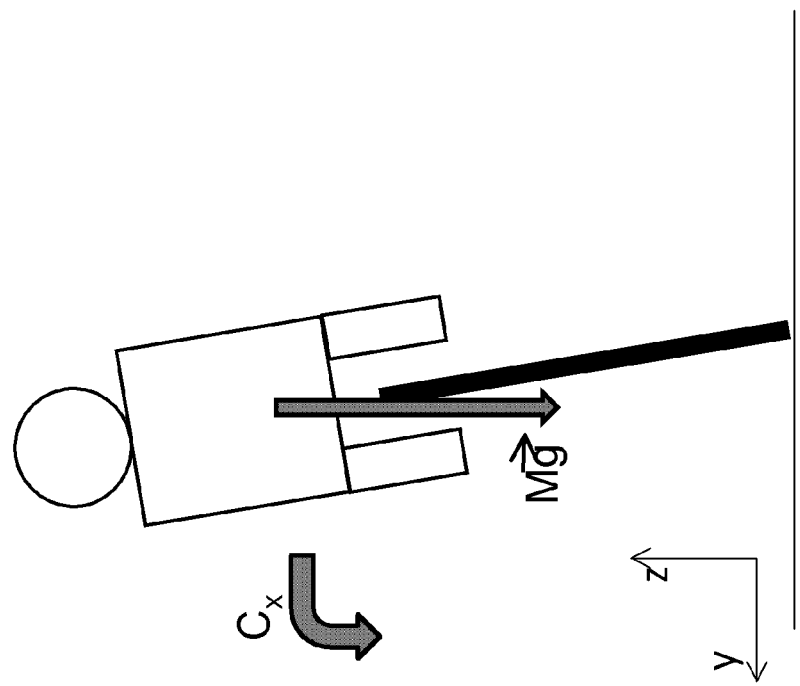
FIG. 2 is a rear view illustrating the laying-down moment for a standard bicycle of the prior art.
Figure 3:
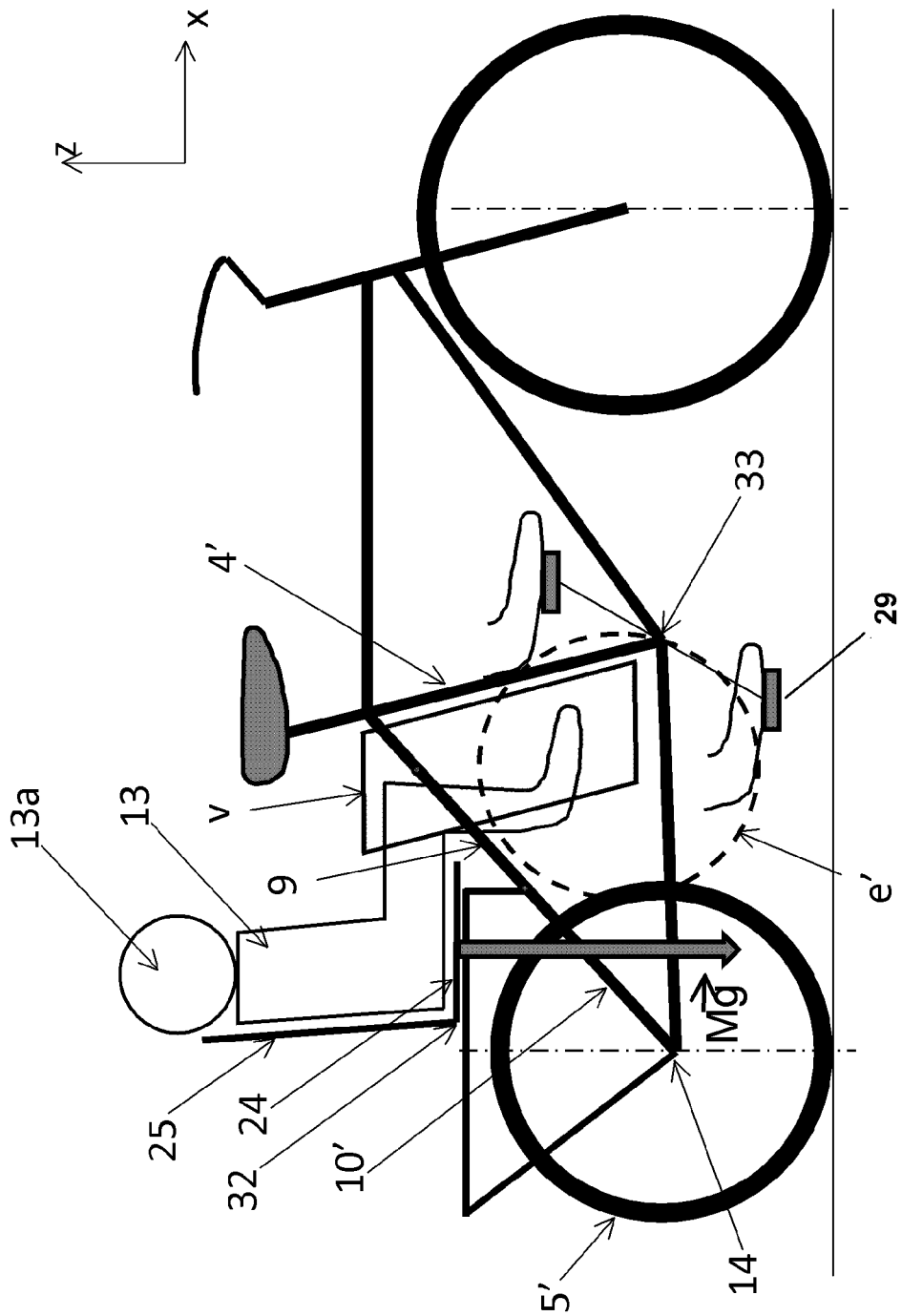
FIG. 3 is a side view of the bicycle according to an embodiment of the invention.
Figure 4:
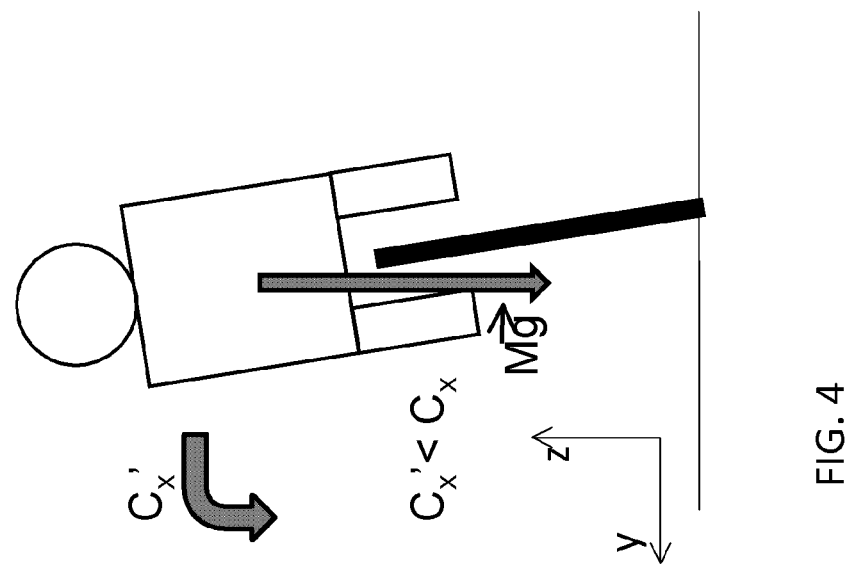
FIG. 4 is a rear view of the bicycle of FIG. 3.

More particularly, the invention proposes realigning the weights by advancing the child seat inside the wheelbase of the bicycle (compare FIGS. 1 and 3) and by lowering the center of gravity (Mg) of the latter by dropping the base of the seat (compare FIGS. 2 and 4).

Consequently, it involves solving the two problems presented above:

the pitching-up moment $C_Y$ disappears because the center of gravity of the child is inside the wheelbase, between the contact points of the front and rear wheels and the ground, the laying-down moment $C_X$ is reduced by the lowering of the center of gravity of the child.

The adoption of a rear wheel of smaller diameter (for example 20 inches: 500 mm) makes it possible to lower the seat. It also makes it possible to move the wheel axle back while minimizing the increase in the overall length of the bicycle. A free space (V in FIG. 3) is thus available between the seat tube 4' and the rear wheel 5'.

However, the installation of a child seat in this space is normally not possible because the feet of the child are found inside the envelope (e in FIG. 1) described by the feet, more specifically the heels 30, of the adult when he pedals, thus causing a collision (at 7, FIG. 5) between the feet 30 of the adult and the feet 31 of the child 13.

The invention proposes to solve this problem by modifying the load-bearing structure 10 of the bicycle that links the upper end of the seat tube 4 to the rear wheel axle 14, a structure often referred to as rear fork or seat stay (10 and 10' in FIGS. 1, 3, 5 and 6), to transfer the feet of the child to the inside of this load-bearing structure.

According to an embodiment, there is adapted for this purpose, behind the seat tube, a frame, for example a tubular quadrilateral (9 in FIGS. 3 and 6) attached, directly or not, on the one hand to the seat tube and on the other hand to the rest of the rear fork or seat stay 10' of the bicycle, thus connecting this quadrilateral to the rear wheel axle 14. By comparison, the configuration corresponding to a conventional installation is presented in FIG. 5.

The quadrilateral 9 thus defines a passage that makes it possible for the feet 31 of the child 13 to be located inside the load-bearing structure or rear frame of the bicycle.

According to an aspect of the invention, the intersection 32 between the base 24 and the back 25 of the child seat (see FIG. 3) is found less than 750 mm, preferably less than 700 mm, from the axle (33) of the crankset. This distance (x) is illustrated in, for example, FIG. 10.

Figure 8:
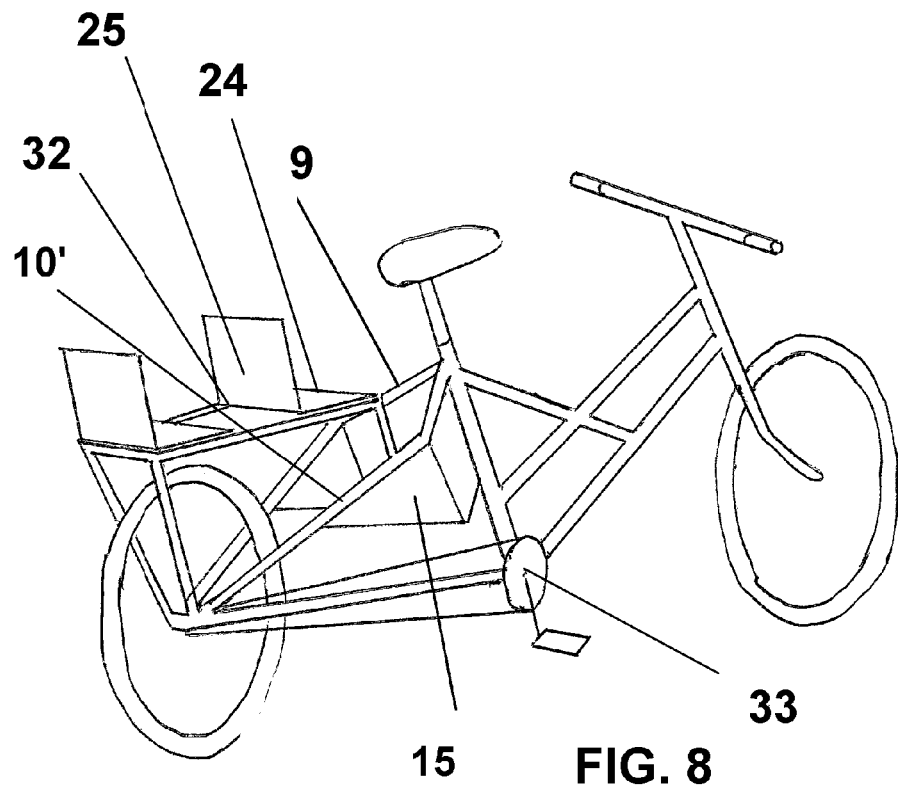
FIG. 8 is a diagrammatic view in perspective of a bicycle with a tubular seat stay and non-carrier baskets.
Figure 9:
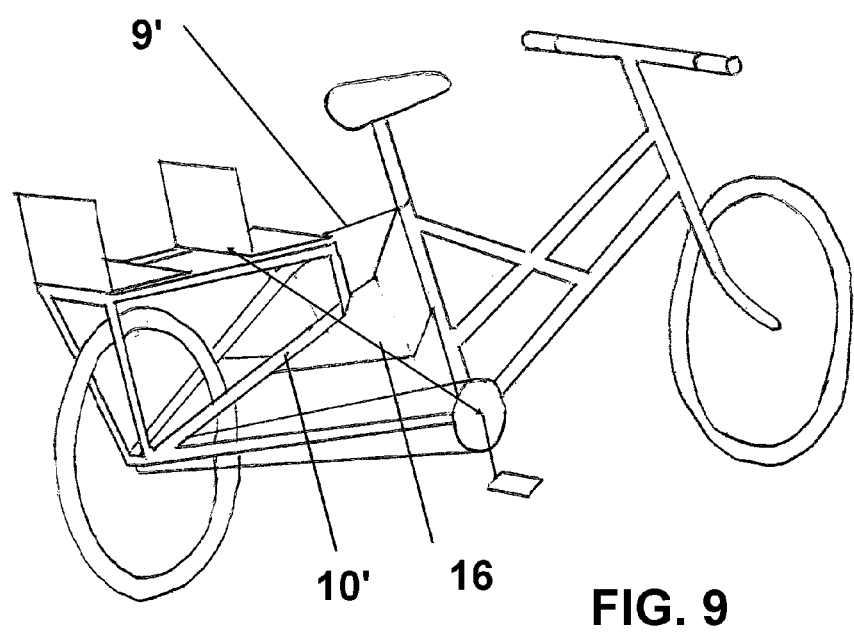
FIG. 9 is a diagrammatic view in perspective of a bicycle with a carrier-basket structure.

According to another embodiment illustrated in FIGS. 8 and 9, lateral panels 15, 16 are provided that enclose at least partially the space intended to contain the feet of the child, panels that can be load-bearing to replace partially or totally a portion of the tubular structure.

Figure 7:
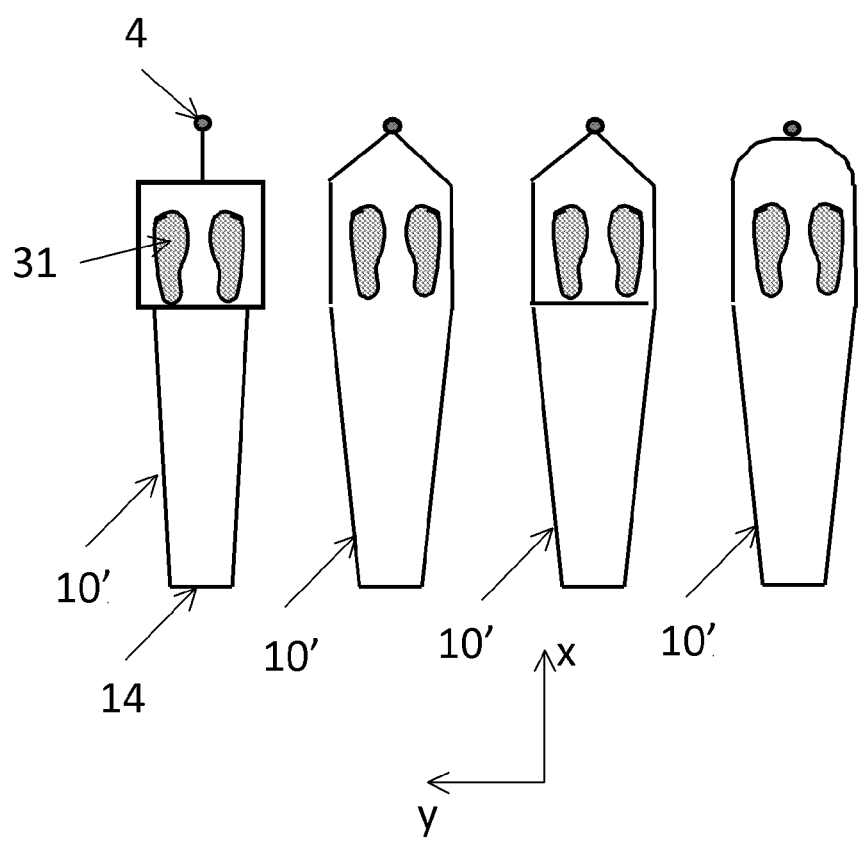
FIG. 7 illustrates, seen from above, several possible configurations of rear tubular seat stays.

FIG. 7 presents, seen from above, several possible forms of rear seat stays 10', namely from left to right a quadrilateral-shaped structure, a straight tube structure without reinforcement, a straight tube structure with crosswise reinforcement, or a curved tube structure without reinforcement. The position of the feet 31 of the child and the wheel axle 14 are illustrated.

Furthermore, to increase the available width for the feet 31 of the child, it is advantageously possible to enlarge the distance between the pedals 29 (d in FIG. 5 of the prior art becomes d' in FIG. 6) for example more than 225 mm (d'), against about 200 mm (d) traditionally. Thus, a collision is avoided, at 7 in FIG. 5, between the feet of the child and the feet of the pedaling adult.

The invention therefore makes it possible to realign the child seat inside the wheelbase and also offers the feature of doing it without significantly increasing the overall length of the bicycle. Actually, the bicycle can be provided with a wheel 5' of 22 inches or less at the rear and also at the front.

The gain in length between a bicycle equipped with two wheels of 700 mm in diameter and a bicycle equipped with a wheel of 22 inches in the front and 20 in the rear represents: 700*2/2−(20+22)*25.4/2=166 mm. The overall length of the bicycle increases therefore less than the elongation of the wheelbase.

An example of a bicycle with tubular structure is presented in perspective in FIG. 8. Seen there is the opening between the rear seat stays 10' that makes it possible to pass through the feet 31 of the child that is found farthest forward. Also seen there is the containment of the feet thanks to a protective panel of plastic material 15 that prevents the feet of the child from moving farther apart and touching those of the adult.

An example of a bicycle where the containment zone 16 is an integral part of the load-bearing frame is presented in FIG. 9. This part of the frame is made of, for example, structural sheet metal, on which the rear seat stays 10' are joined.

Figure 10:
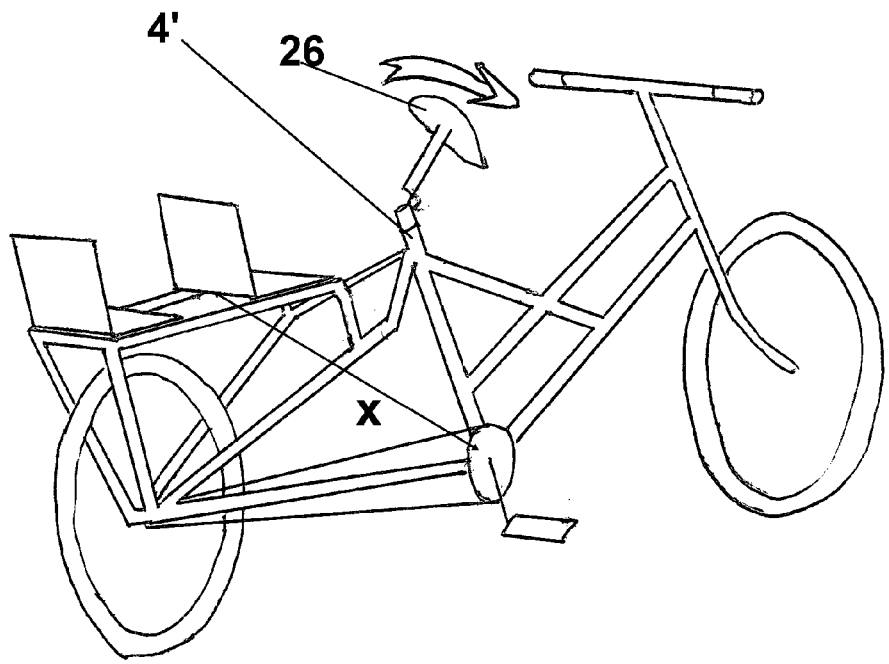
FIG. 10 is a diagrammatic view illustrating the tipping of the seat.

FIG. 10 shows a seat 26 that is fastened on a seat tube, one end of which can be folded toward the front so as to facilitate the installation and the disengagement of the child located on the front seat.

Figure 11:
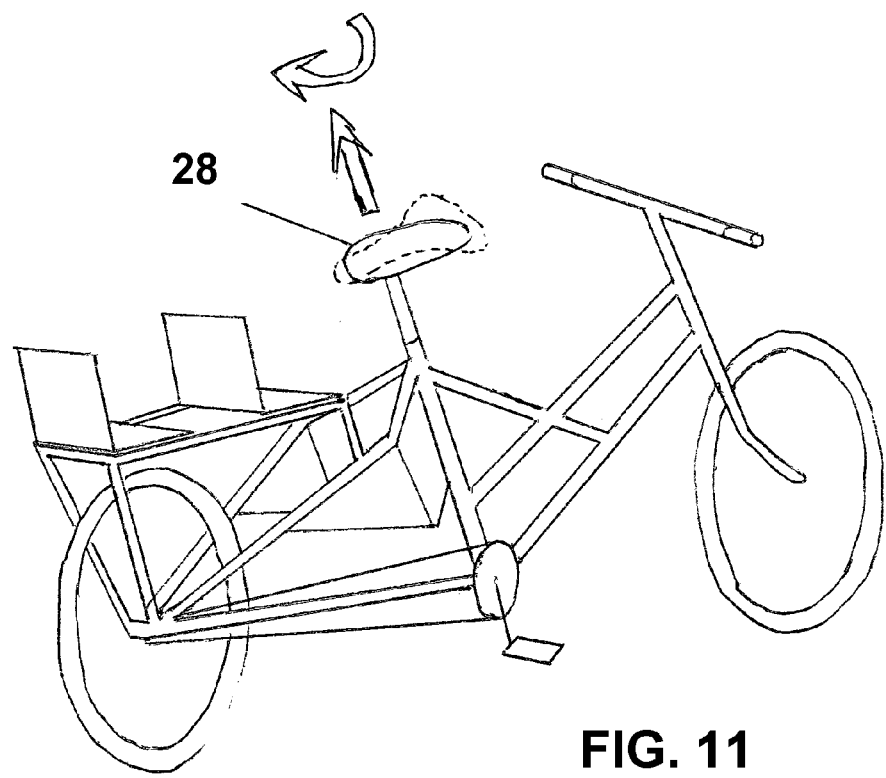
FIG. 11 is a diagrammatic view illustrating the pivoting of the seat.

FIG. 11 shows a seat 28 that can pivot 180° around the axis of the seat tube 4 when it is lifted up and when it is disengaged from its locking mechanism. Once the seat has been put back, its tip in the direction of travel, it goes back down and is locked, for example, under the weight of the adult by means of a wedge (taper).

Figure 12:
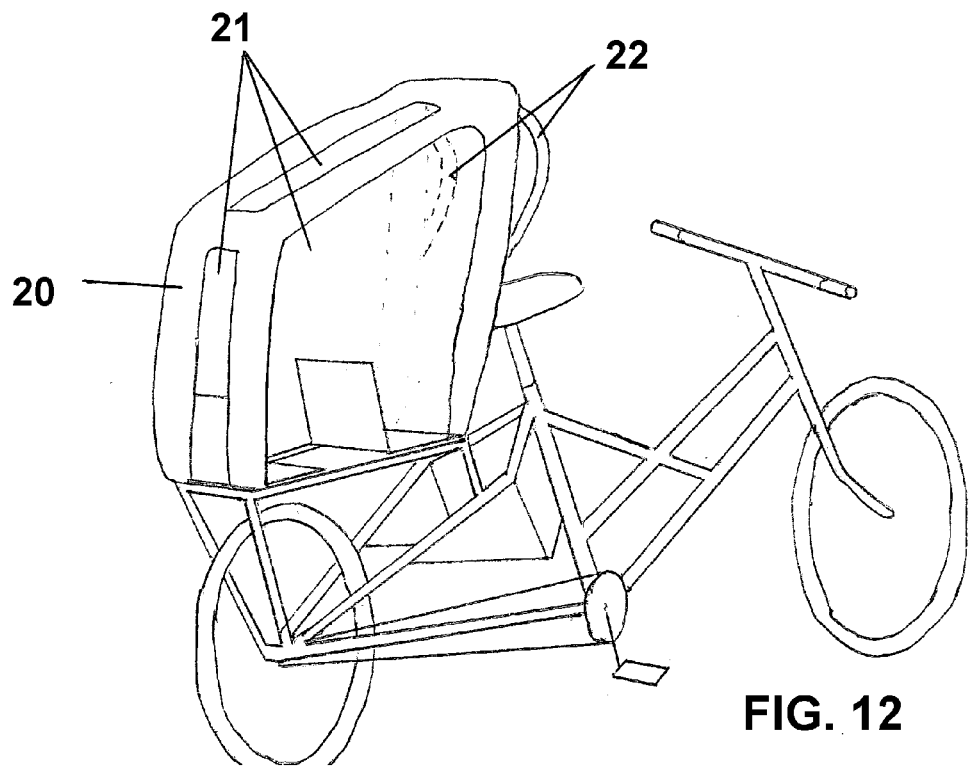
FIG. 12 is a diagrammatic view illustrating the presence of a protective hood.
Figure 13:
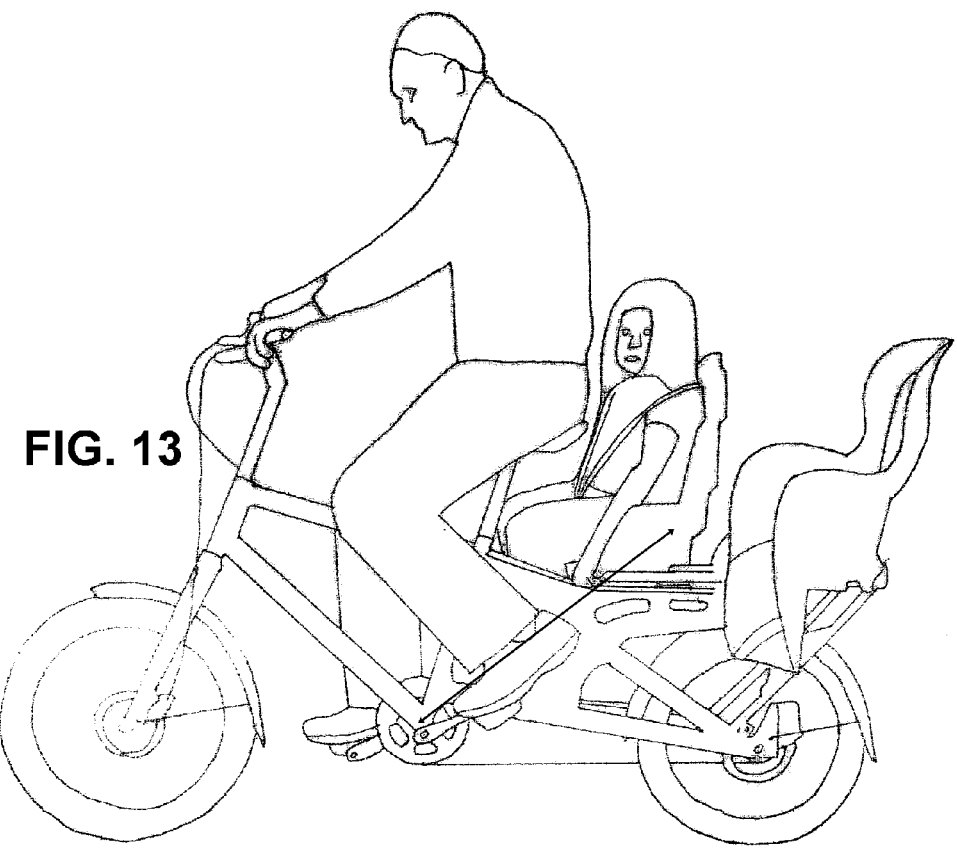
FIG. 13 is a general illustration, seen from the side, of a bicycle according to an embodiment of the invention with an adult user and a child.

FIG. 12 illustrates an embodiment where a hood is provided that accommodates the child (children), made of flexible and transparent plastic material 21, reinforced by a structure made of inflatable flexible tubes 20, or using rods. The adult seated on the seat can catch hold of the hood on his back like a backpack by means of straps 22 for holding it in its front part. The hood is advantageously equipped with reflective surfaces on the sides and at the back.

In summary, the invention relates to a bicycle equipped with a seat for a child in which the seat is positioned behind the adult, directed forward, and in which the placement for the feet of the child is found inside the portion of the load-bearing structure of the bicycle connecting the seat tube to the rear wheel axle, a portion thus forming a modified seat stay.

The seat of the bicycle is positioned, so that in use, the feet of the child are found inside the envelope (e', FIG. 3) described by the movement of the heels of the adult during pedaling, seen from the side.

The heels of the adult during pedaling pass, at least partially, to the outside of the feet of the child and of the structure of the modified seat stay 9 and 10' thanks to a separation (d') of the pedals 29 that is greater than that of a standard bicycle, for example about 200 mm and preferably greater than 225 mm.

According to another aspect of the invention, the intersection 32 between the base 24 and the back 25 of the child seat is found at less than 750 mm, preferably less than 700 mm, from the axle 33 of the crankset.

According to another aspect of the invention, the base 24 of the child seat is at less than 700 mm, preferably less than 675 mm, from the ground.

The bicycle can be equipped with a second child seat. The length cannot exceed 2,000 mm, preferably 1,900 mm.

The diameter of the rear wheel is preferably less than the diameter of the front wheel.

According to an embodiment, the front wheel has a diameter of between 450 and 750 mm, preferably 500 to 700 mm, and/or the rear wheel is between 390 and 520 mm.

The bicycle can have a tubular frame 9 that is part of the load-bearing structure, whose plane is perpendicular to the plane of the bicycle and slantways in relation to the ground, incorporated between the seat tube and a seat stay structure connected to the axle of the rear wheel, said tubular frame allowing the feet of a child seated in said seat to pass through.

The bicycle can comprise a panel or a system of panels made of sheet metal 16, incorporated between the seat tube and a seat stay structure 10' connected to the axle 14 of the rear wheel, said sheet metal structure at least partially delimiting a space able to receive the feet of the child.

The invention claimed is:

1. A bicycle with a second seat behind a first seat for a driver of the bicycle, both the first and second seats being directed forward, the bicycle comprising:
   a seat tube supporting the first seat and a load bearing structure connecting the seat tube to an axle of a rear wheel of the bicycle, the second seat being on the load bearing structure;
   the load bearing structure delimiting a space for feet of a passenger in the second seat, wherein the space for feet of the passenger is inside the load-bearing structure; and
   a hood covering the second seat and made, at least in part, of transparent material, the hood comprising at least one of an inflatable structure and rods, and the hood further comprising straps adapted to be engaged by the driver in the first seat.

2. A bicycle with a second seat behind a first seat for a driver of the bicycle, both the first and second seats being directed forward, the bicycle comprising:
   a seat tube supporting the first seat and a load bearing structure connecting the seat tube to an axle of a rear wheel of the bicycle, the second seat being on the load bearing structure; and
   the load bearing structure including a seat stay structure connected to the axle of the rear wheel and a sheet structure connected to the seat stay structure and the seat tube, the sheet structure including two panels that have opposing faces spaced apart in a direction perpendicular to a longitudinal axis of the bicycle, each of the two panels having a first edge attached to the seat stay structure, and a second edge attached to the seat tube,
   wherein the opposing faces of the two panels delimit therebetween a space for feet of a passenger in the second seat so that the space for feet of the passenger is inside at least part of the load-bearing structure.

* * * * *